No. 748,663. PATENTED JAN. 5, 1904.
H. SELSOR.
CELL CASE.
APPLICATION FILED JAN. 31, 1903.
NO MODEL.

Witnesses
M. E. Cordel.
Geo. E. Few.

Inventor
Hiram Selsor
by Milo B. Stevens & Co.
Attorneys

No. 748,663. Patented January 5, 1904.

UNITED STATES PATENT OFFICE.

HIRAM SELSOR, OF HUNNEWELL, MISSOURI.

CELL-CASE.

SPECIFICATION forming part of Letters Patent No. 748,663, dated January 5, 1904.

Application filed January 31, 1903. Serial No. 141,273. (No model.)

*To all whom it may concern:*

Be it known that I, HIRAM SELSOR, a citizen of the United States, residing at Hunnewell, in the county of Shelby and State of Missouri, have invented certain new and useful Improvements in Cell-Cases; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates particularly to cell-cases for packing fruit in crates or boxes for shipping; and its general object is to provide an improved protected receptacle for fruit or other articles which shall be cheap and compact and well adapted to its uses.

A particular object is to provide a case in which separate cells are so made as to be slightly variable in size to accommodate the different sizes that may occur in the articles to be packed. In packing fruit it is usual that the fruit is of different sizes, and to permit the greatest economy and fitness it is desirable that the case be so formed that its cells can be varied accordingly.

In making the case according to my invention either plain or corrugated pasteboard may be used, cut into strips of proper width to accommodate the kind of fruit to be packed, and the adjustable construction is produced by either slits in the strips and locking-keys or by loops which join the strips and permit them to be drawn therethrough to make the cells larger or smaller.

Figure 1:
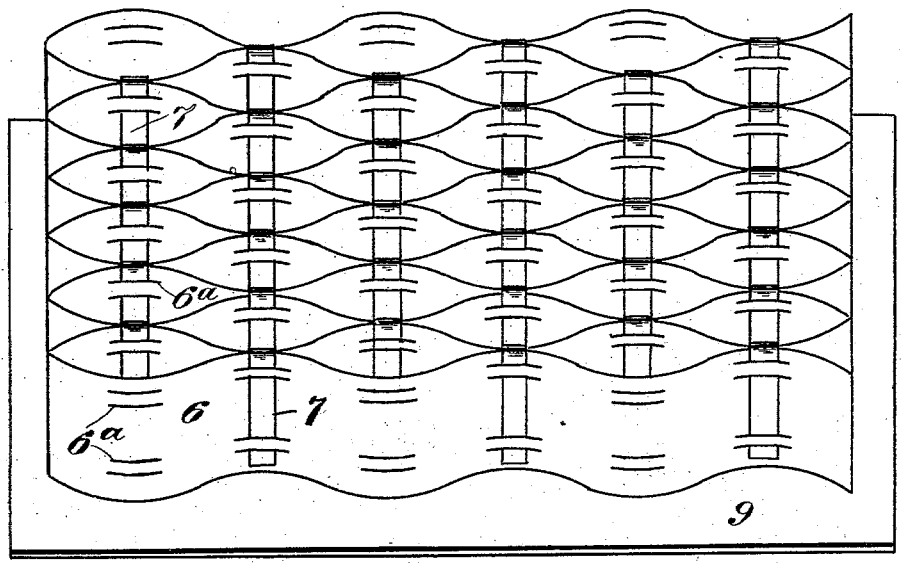
Figure 3:
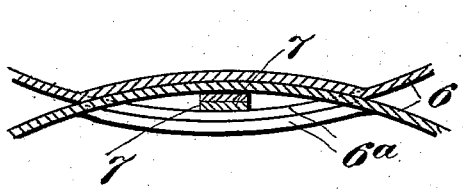
Figure 4:
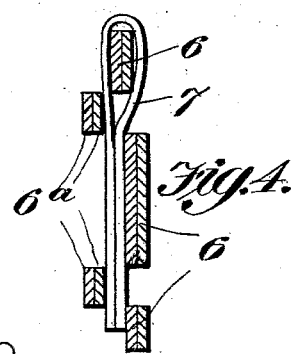
Figure 2:
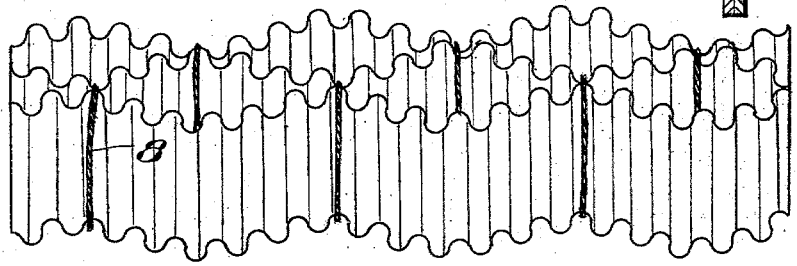

In the accompanying drawings, Figure 1 is a perspective view of the cell-case having plain strips with slits and the locking-key. Fig. 2 is a perspective view of the corrugated strips with loops. Fig. 3 is an enlarged horizontal section of one of the joints of the strips shown in Fig. 1, and Fig. 4 is a vertical section.

Referring specifically to the drawings, 6 indicates the strips forming a case, which are of proper height to suit the fruit or other article and of proper length to fit the packing-box. In the form shown in Figs. 1, 3, and 4 these strips are plain and are slitted, as at 6ª, at suitable distances apart to form cells of the desired size. The strips are joined alternately to the adjacent strips on each side by means of vertical locking strips or keys 7, which are woven in through the slits where the strips come together. No part of the substance of these strips is removed; but the slits in all the strips are made at the same distance apart both lengthwise and crosswise, so that they register with each other, and the locking-keys extend through the registering slits of both strips at the joints. The keys are doubled or bent over the upper edge of the strips, as shown clearly in Fig. 4, so that they cannot slip down and out or become misplaced.

The slits are made longer than is necessary to receive the keys, so that the keys may be moved lengthwise of the slits from one end to the other, the effect of which is to make the cells larger or smaller. When an unusually large piece of fruit is to be packed, it will when forced into the cell force the keys lengthwise a sufficient distance to make the cell large enough to receive it. This of course makes the next cell correspondingly smaller, the general effect being in packing fruit of different sizes to form a case of cells of various sizes accordingly. This I consider a substantial improvement over cases in which the cells are formed by crossed and slotted strips or otherwise, so that no play of the strips with respect to each other is permitted.

To form the cells of corrugated paper, as shown in Fig. 2, the strips are joined at suitable points by loops 8, made of cord or other suitable material, and the strips pass through these loops. With the loop construction the loops will slide lengthwise upon the strips, so that the cells are varied in size accordingly.

As will be understood, the layers in the box formed by the cases above described will be separated by horizontal partitions, as indicated at 9, to complete the cells and to support the weight of the upper tiers. These partitions may be perforated for ventilation and otherwise accommodated to the use.

When not in use, the cases are collapsible, as is customary in articles of this kind.

What I claim as new, and desire to secure by Letters Patent, is—

1. A cell-case comprising a series of bent strips joined in contact to each other on opposite sides alternately, forming opposite walls of the same cells, and unions at the joints movable lengthwise along the strips.

2. A cell-case comprising a series of flexible strips standing on edge side by side and joined to each other on opposite sides alternately, forming opposite walls of the same cells, and connections at the joints movable lengthwise along the strips.

3. A cell-case comprising a series of flexible strips standing edgewise side by side, joined to each other on opposite sides alternately, and having registering lengthwise slits at the joints, and locking-strips extending through the slits.

4. A cell-case comprising a series of joined flexible strips having registering lengthwise slits at suitable spaces apart, and locking-strips of less width than the length of the slits, extending crosswise therethrough, whereby longitudinal movement of the locking-strips is permitted.

5. A cell-case comprising a series of flexible strips bent to contact with and joined to each other on opposite sides alternately forming opposite walls of the same cells, and connecting loops at the joints, movable lengthwise along the strips.

HIRAM SELSOR.

Witnesses:
J. A. SPENCER,
J. E. SPENCER.